(12) United States Patent
Wu et al.

(10) Patent No.: US 11,327,989 B2
(45) Date of Patent: May 10, 2022

(54) MULTI-DIMENSIONAL INDUSTRIAL KNOWLEDGE GRAPH

(71) Applicant: Accenture Global Solutions Limited, Dublin (IE)

(72) Inventors: Yikai Wu, Beijing (CN); Fang Hou, Beijing (CN); Xiaopei Cheng, Beijing (CN); Hui Shen, Beijing (CN)

(73) Assignee: Accenture Global Solutions Limited, Dublin (IE)

( * ) Notice: Subject to any disclaimer, the term of this patent is extended or adjusted under 35 U.S.C. 154(b) by 303 days.

(21) Appl. No.: 16/620,701

(22) PCT Filed: Aug. 2, 2017

(86) PCT No.: PCT/CN2017/095619
§ 371 (c)(1),
(2) Date: Dec. 9, 2019

(87) PCT Pub. No.: WO2019/023982
PCT Pub. Date: Feb. 7, 2019

(65) Prior Publication Data
US 2020/0201875 A1    Jun. 25, 2020

(51) Int. Cl.
*G06F 16/25* (2019.01)
*G06F 16/901* (2019.01)

(52) U.S. Cl.
CPC ........ *G06F 16/254* (2019.01); *G06F 16/9024* (2019.01)

(58) Field of Classification Search
None
See application file for complete search history.

(56) References Cited

U.S. PATENT DOCUMENTS 7,409,328 B1    8/2008   McGaughy et al.
7,676,288 B2    3/2010   Middleton, Jr.
(Continued)

FOREIGN PATENT DOCUMENTS

CN        105677723 A     6/2016
CN        106662854 A     5/2017
WO   WO 2015/181758 A1   12/2015

OTHER PUBLICATIONS

Collarana, Diego, et al., "FuhSen: A Platform for Federated, RDF-based Hybrid Search", ACM WWW'16 Companion, pp. 171-174. (Year: 2016).*

(Continued)

*Primary Examiner* — Scott A. Waldron
(74) *Attorney, Agent, or Firm* — Crowell & Moring LLP

(57) ABSTRACT

A customized industrial graph knowledge base for an industrial operation includes a graph database storing nodes of multiple dimensions predefined according to the nature and characteristics of the industrial operation. The nodes are extracted from baseline, domain-specific, and implementation specific industrial knowledge data sources using various analytics for structured and unstructured data. The customized industrial graph knowledge base further includes edges representing relationships between nodes that are either inter-dimensional or intra-dimensional. The importance of each node to the industrial operation is further quantified using a graph model and is included in the graph database as a composite filtering parameter.

20 Claims, 16 Drawing Sheets

(56) References Cited

U.S. PATENT DOCUMENTS

| | | | |
|---|---|---|---|
| 10,019,537 B1* | 7/2018 | Tsypliaev | G06F 16/9024 |
| 10,496,678 B1* | 12/2019 | Tang | G06F 16/282 |
| 2004/0039468 A1* | 2/2004 | Zahorack | G06F 9/54 |
| | | | 700/95 |
| 2008/0126408 A1 | 5/2008 | Middleton | |
| 2013/0066823 A1* | 3/2013 | Sweeney | G06N 5/02 |
| | | | 706/50 |
| 2014/0289173 A1* | 9/2014 | Byron | G06N 20/00 |
| | | | 706/12 |
| 2016/0092820 A1* | 3/2016 | Ebel | G05B 19/41885 |
| | | | 705/7.41 |
| 2016/0261466 A1* | 9/2016 | Daniel | G06F 8/36 |

OTHER PUBLICATIONS

Collarana, Diego, et al., "MINTE: Semantically Integrating RDF Graphs", ACM WIMS'17, 11 pages. (Year: 2017).*

Office Action and Search Report in China Application No. 201780092654.3, including English Translation, dated Nov. 27, 2020, 11 pages.

International Search Report and Written Opinion of the International Search Authority dated May 21, 2018 in International Application No. PCT/CN2017/095619 (English language) (6 pp.).

* cited by examiner

MULTI-DIMENSIONAL INDUSTRIAL KNOWLEDGE GRAPH

CROSS-REFERENCE TO RELATED APPLICATION

This application is the U.S. National Stage of International Application No. PCT/CN2017/095619, filed on Aug. 2, 2017.

TECHNICAL FIELD

This disclosure is related to knowledge bases in general and industrial graph knowledge bases in particular.

BACKGROUND

A graph database is a foundational component for a graph knowledge base. The graph knowledge base includes the graph database, a processing platform and interface to issue queries and analyze query results, and procedures to build, expand, and update the graph database. A graph knowledge base may be alternatively referred to as a knowledge graph. The efficiency of an application that accesses information in a graph knowledge base depends critically on the underlying organization and architecture of the graph knowledge base.

DETAILED DESCRIPTION

Figure 1:
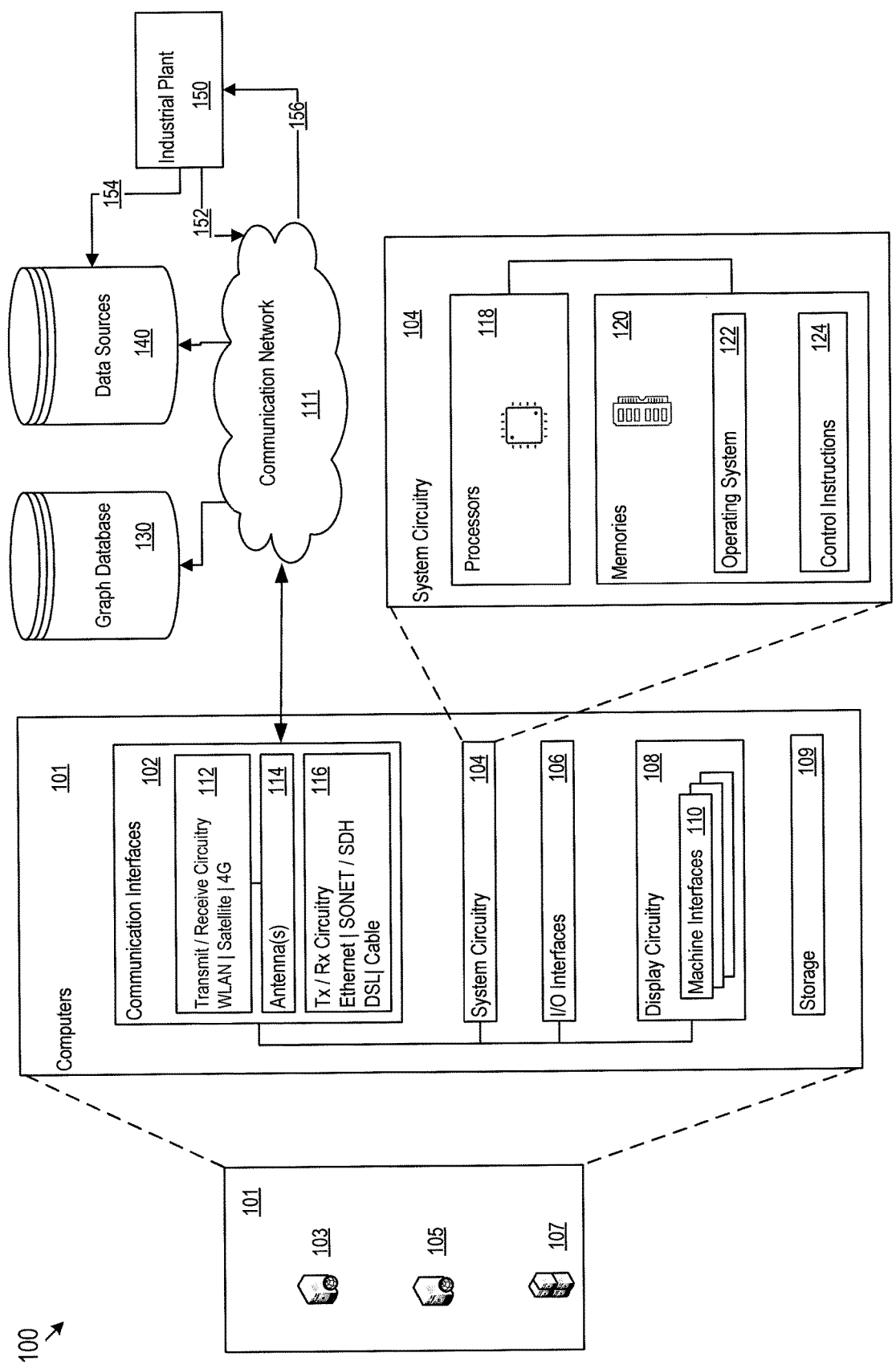
FIG. 1 shows an example system for implementing a customized industrial graph knowledge base.

This disclosure relates to a graph knowledge base customized for a specific industrial operation of a specific industrial setting. Chemical synthesis, petroleum refining, and electric power production, are all examples of different types of industries and different industrial settings. An industrial setting may exist for any specific industrial operation, and the industrial setting may include any type of industrial plant that carries our any type of industrial operation. Examples of industrial operations include synthesizing a particular set of chemicals, fabricating semiconductor wafers, and performing water treatment. The industrial operations carried out in any industrial setting may vary in specific implementation by company, location, or other characteristic.

The operation of a specific industrial plant may involve a large number of entities having complex relationships. These entities, for example, may include physical as well as abstract items of disparate nature and characteristics, including but not limited to domain processes, facilities, equipment, sensors/sensor parameters, personnel hierarchies, supply chains, raw materials, intermediate products, final products, key performance measures, customers, power consumptions, emissions, and regulation compliances. Data representing some or all of these entities and their relationships may be used to build a customized knowledge base for the plant. However, these entities and their relationships may not be readily available in an organized form. They may instead be embedded as various data elements in scattered data sources. For example, baseline industrial data elements related to the plant may be embedded in data sources describing knowledge common to various types of industrial settings. Domain-specific data elements, on the other hand, may be embedded in data sources containing knowledge common to all industrial operations implementing the same or similar specific industrial setting (or the same industrial domain). For another example, implementation-specific data elements may be embedded in data sources specifically maintained and kept within the plant. These scattered data sources may be in a large number of distinctive formats and may be structured or unstructured. Structured data sources, for example, may include relational databases and other data sources with tabulated or other forms of organized data. Unstructured data sources may include, for example, free-form documents, operation manuals, and notes.

Automatic extraction from the various scattered data sources of a set of entities and relationships that accurately describe and represent the industrial operation in multiple facets thus involves complex data analytics and extraction of the scattered data sources. The extracted entities and relationships may form a basis for the customized knowledge base for the industrial operation. Given the disparity of these entities and the complex relationship between them, their organization in the customized knowledge base is critical for the customized knowledge base to provide intelligent, accurate, and efficient data services to the operators and controllers of the industrial operation.

Because of the complexity of the data involved in an industrial operation, a traditional relational database may not be suitable as a storage layer for data characterized by entities and relationships. An industrial knowledge base customized to a specific industrial operation may instead be based on storing various entities and relationships in a graph database, such as the open-source graph database management system Neo4j. In Neo4j, a graph database may be used to store a collection of nodes, edges and attributes. These components of a graph database may be alternatively referred to as graph structural components. A node may represent any physical or abstract entity that plays a certain role in the industrial operation. An edge may be used to connect two nodes and may represent relationship between nodes. The relationships between the nodes, in the form the edges, may be directional. While a freeform graph database such as that used in Google Knowledge Graph may be suitable for nodes and relationships having expansive and unpredictable nature, the types of nodes and relationships in a specific industrial setting of the specific industrial operation may be more structured. Consequently, the organization of an industrial graph database customized to the specific industrial operation may also take a more structured form for achieving better data processing and querying efficiency.

The system described below builds a customized industrial knowledge base for the specific industrial operation based on the industrial graph database above. In the implementations of such a customized industrial graph knowledge base, a sufficient set of entities and relationships embedded in various data sources containing baseline, domain-specific, and implementation-specific data elements are extracted based on various techniques, such as machine learning algorithms, natural language processing techniques, and relational database analytics. Further, the extracted entities and relationships are organized into a plurality of dimensions predetermined based on the nature and characteristics of the specific industrial operation. Each of the predetermined dimensions defines a category of entities of the specific industrial operation. These extracted and categorized entities and relationships between the entities may then be stored in a graph database as nodes and edges. Further, a filtering parameter, also referred to as composite filtering parameter, such as a value representing importance of each node and edge to the industrial operation may be estimated and quantified using, e.g., graph probability models. Such quantified measure of importance for the entities and relationships may further be included in the graph database and used, for example, in filters for data queries. The customized industrial knowledge base based on the graph database may further provide various intermediate data repositories developed from the graph database. The customized industrial knowledge base may additionally include an interface for applications to access the data stored in the graph database and the intermediate data repositories. These applications may provide efficient data queries and data services for monitoring, controlling, and optimizing the specific industrial operation.

In FIG. 1, a customized graph knowledge base 100 for a specific industrial operation is shown as including a group of computers 101, such as computers 103, 105, and 107. Computers 101 may include communication interfaces 102, system circuitry 104, input/output (I/O) interfaces 106, storage 109, and display circuitry 108 that generates machine interfaces 110 locally or for remote display, e.g., in a web browser running on a local or remote machine. The machine interfaces 110 and the I/O interfaces 106 may include GUIs, touch sensitive displays, voice or facial recognition inputs, buttons, switches, speakers and other user interface elements. Additional examples of the I/O interfaces 106 include microphones, video and still image cameras, headset and microphone input/output jacks, Universal Serial Bus (USB) connectors, memory card slots, and other types of inputs. The I/O interfaces 106 may further include magnetic or optical media interfaces (e.g., a CDROM or DVD drive), serial and parallel bus interfaces, and keyboard and mouse interfaces.

The communication interfaces 102 may include wireless transmitters and receivers ("transceivers") 112 and any antennas 114 used by the transmitting and receiving circuitry of the transceivers 112. The transceivers 112 and antennas 114 may support Wi-Fi network communications, for instance, under any version of IEEE 802.11, e.g., 802.11n or 802.11ac. The communication interfaces 102 may also include wireline transceivers 116. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The computers 101 of the customized graph knowledge base 100 may communicate with data sources 140 via the communication interface 102 and the communication network 111. The computers 101 of the customized graph knowledge base 100 may communicate with the specific industrial operation, or industrial plant 150 via the communication interfaces 102 and the communication network 111. The data sources 140 may further communicate with the industrial plant 150 either directly or via the communication network 111. For example, the data sources 140 may obtain updates of implementation-specific data elements from the industrial plant 150, as shown by arrows 152 and alternatively 154. The Industrial plant 150 may receive data from computers 101, the graph database 130 via the network 111, as shown by 156. The customized graph knowledge base 100 further includes a graph database 130. The graph database 130 may be in communication with computers 101 via the communication interfaces 102 and the communication network 111. The operators and controllers of the industrial plant may access the customized graph knowledge base 100 via the communication network 111 for submitting queries and obtaining queried and analyzed data.

The storage 109 may be used to store various initial, intermediate, or final data or model for building, updating, and operating the customized graph knowledge base 100. The graph database 130 may store the multi-dimensional nodes and edges representing entities and relationships for the specific industrial operation. The term entities with respect to the graph database may be alternatively referred to as data entities. The data sources 140 may contain baseline, domain-specific, and implementation specific industrial data items. The storage 109, the graph database 130, and the data sources 140 may be centralized or distributed. For example, they may be hosted remotely by a cloud computing service provider. Part of the data sources 140 may be operated by a third party. For example, baseline and domain specific data items among the data sources may be provided by other industrial organizations in various forms including but not limited to other knowledge bases.

The system circuitry 104 may include hardware, software, firmware, or other circuitry in any combination. The system circuitry 104 may be implemented, for example, with one or more systems on a chip (SoC), application specific integrated circuits (ASIC), microprocessors, discrete analog and digital circuits, and other circuitry. The system circuitry 104 is part of the implementation of any desired functionality related to the building, maintenance, and application of the customized graph knowledge base. As just one example, the system circuitry 104 may include one or more instruction processors 118 and memories 120. The memories 120 stores, for example, control instructions 124 and an operating system 122. In one implementation, the instruction processors 118 executes the control instructions 124 and the operating system 122 to carry out any desired functionality related to the customized graph knowledge base.

Figure 2:
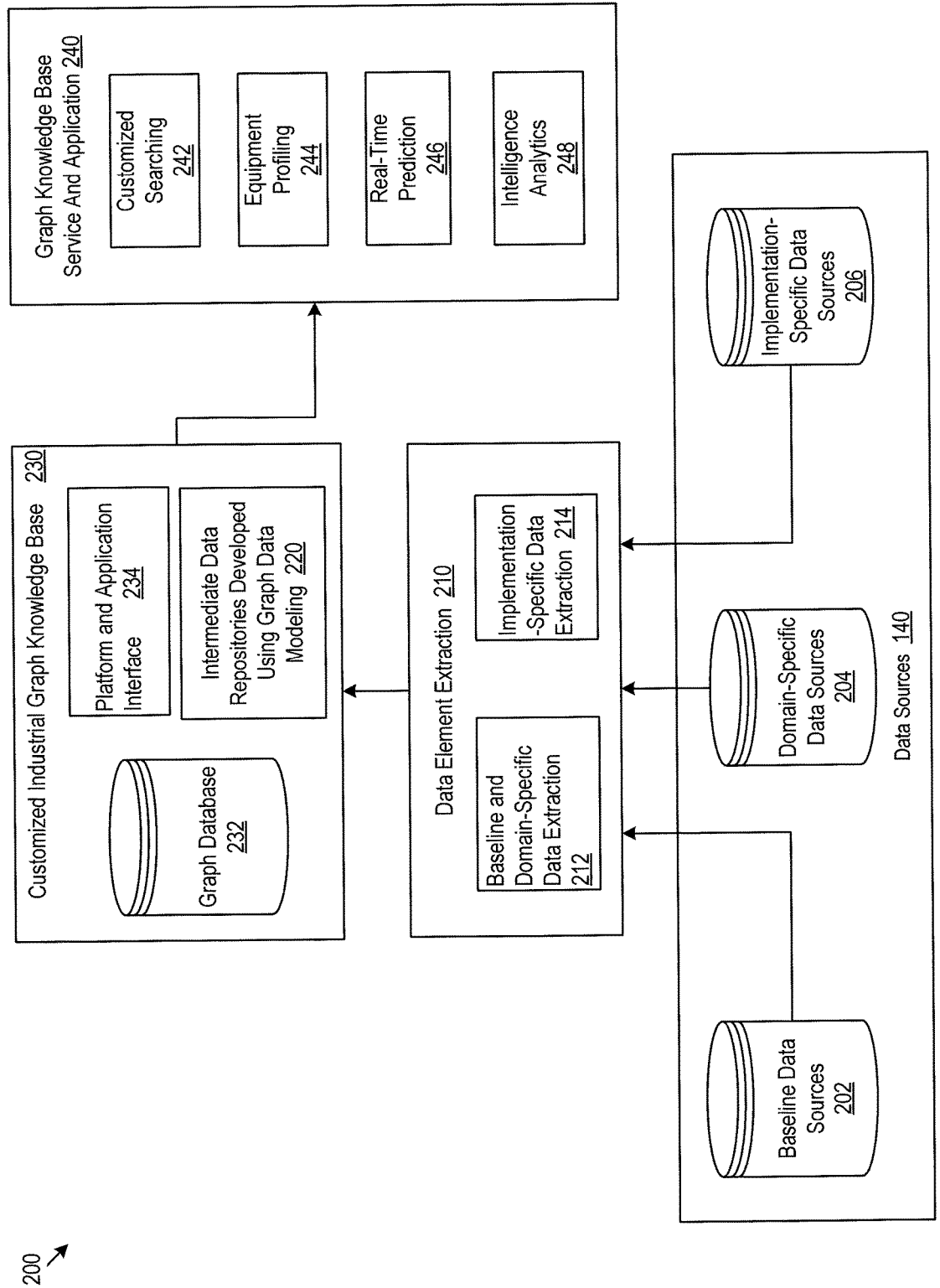
FIG. 2 shows a logic flow and data components for implementing a customized industrial graph knowledge base.

FIG. 2 shows a logic flow and data components 200 for implementing the customized industrial knowledge graph for a specific plant. The logic flow includes data element extraction 210 for processing data from the data sources 140 and further includes establishing the customized industrial graph knowledge base 230. The data sources 140 may include baseline data sources 202 embedded with baseline industrial data elements, domain-specific data sources 204 containing domain-specific industrial data elements, and implementation-specific data sources 206 containing implementation-specific data elements pertaining to the specific plant. The baseline data sources 202 and the domain-specific data sources 204 may, for example, be from external data sources such as open source knowledge bases. The baseline industrial data elements may include data elements related to knowledge common to various types of industrial settings. The domain-specific data elements, on the other hand, may include data elements related to knowledge common to all industrial operations implementing the specific industrial setting. The implementation-specific data elements may include data elements that are specifically maintained and kept within the plant. Although the data sources 140 of FIG. 2 is delineated into three different types, there may be fewer or additional types, and a particular data source may be of a mixed type, embedding a mixture of baseline, domain specific, and implementation specific data elements.

In one exemplary implementation, because the baseline data sources 202, the domain-specific data sources 204, and the implementation-specific data sources 206 may be of distinct format and characteristics, they may be processed by the data element extraction process 210 using different data extraction techniques, as will be described in more detail below. The data element extraction process 210 for extracting data elements may accordingly include separate data element processes 212, and 214 for extracting baseline and domain-specific data elements, and implementation-specific data elements, respectively.

Data elements extracted from the baseline, domain-specific, and implementation specific may be used to build the customized industrial graph knowledge base 230 for providing data services. As shown by the example implementation of FIG. 2, the customized industrial graph knowledge base may include a graph database 232, intermediate data repositories 220, and a platform and application interface 234. Specifically, entities and relationships may be further derived from the data elements extracted from the baseline, domain-specific, and implementation-specific data sources. These entities and relationships may be stored in the graph database 232 as nodes and edges. A graph database is an effectively way to store entity and relationship network.

The graph database 232 may form the basis for the customized industrial graph knowledge base 230 for the plant. The entities and relationships stored in the database may be analyzed using, for example, graph data modeling techniques, to extract various intermediate representations of the graph database in various facets. From these intermediate representations, intermediate data repositories may be further extracted, as shown in 220 and will be explained in more detail below. The intermediate data repositories may be a direct derivative of the graph database, or may be an indirect derivative of the graph database in that some of the data repositories may be derived directly from the data elements extracted in 210. These intermediate data repositories may be used for facilitating fast data services by reducing the amount of processing by the customized graph knowledge base when handling the data services.

The platform and application interface 234 built on top of the graph database 232 may be used for external applications 240 for accessing the graph database 232 and the intermediate data repositories 220, for processing queries and data service requests, for performing analytics on query results, and for providing other data services. Examples of services and applications that may be obtained from the customized industrial graph knowledge base 230 may include searching 242, equipment profiling 244, real-time prediction of performance of the plant 246, and other intelligent analytics 248.

Figure 3:
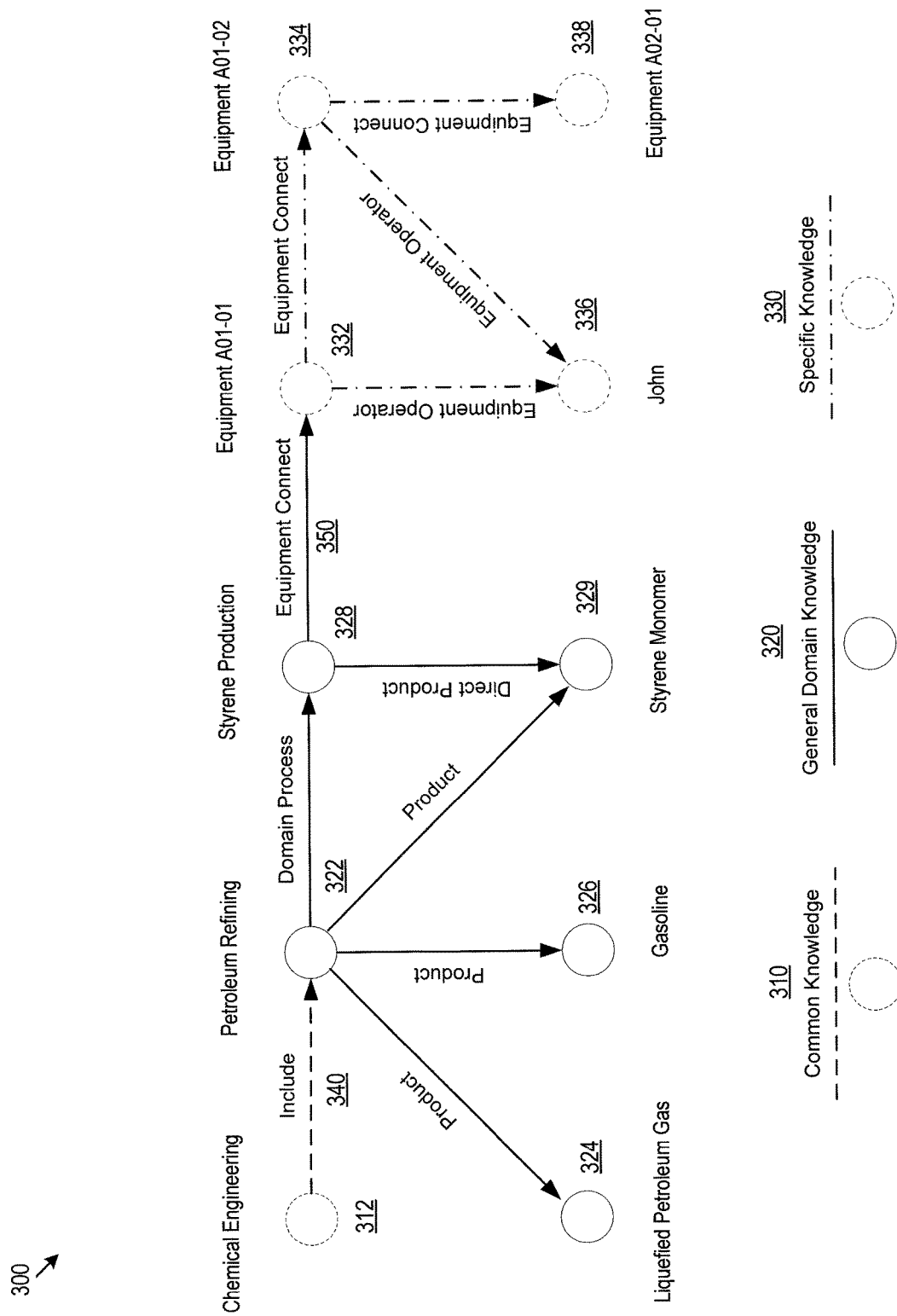
FIG. 3 illustrates exemplary entities in a specific industrial operation and relationships between the entities.

FIG. 3 illustrates an example 300 of entities and relationships in a specific petroleum refinery operation extracted from the baseline, domain-specific, and implementation-specific data elements. In particular, symbols with dashed lines, as shown by 310, represent baseline entities and relationships. Symbols with solid lines, as shown by 320, represent domain-specific entities and relationships. Symbols with dot-dashed lines, as shown by 330, represent implementation-specific entities and relationships.

Entity 312 of FIG. 3, for example, represents a baseline entity of "chemical engineering". Entity 312 is a baseline entity because it is common industrial knowledge that a petroleum refinery operation includes chemical engineering and such knowledge may be extracted from baseline data elements contained in common industrial knowledge data sources. Entities 322 ("petroleum refining"), 324 ("liquefied petroleum gas"), 326 ("gasoline"), 328 ("styrene production"), and 329 ("styrene monomer"), on the other hand, are domain-specific entities and may be extracted from domain-specific data sources pertaining to the petroleum refining industry setting. The relationships between these domain-specific entities may also be extracted from the domain-specific data sources. For example, entities 324 and 326 may be determined as general products of entity 322. Likewise, entity 328 may be determined as a domain process of entity 322 and entity 329 may be determined as a general product of entity 322 as well as a direct product of the entity 328. Entities 332 ("equipment A01-01"), 334 ("equipment A01-02"), 336 ("John"), 338 ("equipment A02-01"), and their relationships may pertain to specific implementation of the particular petroleum refining plant and may be extracted from implementation-specific data sources collected by the petroleum refining plant. For example, entities 332, 334, and 338 may represent specific pieces of connected equipment in the specific petroleum refining plant for styrene production. Their relationships may be represented by "equipment connect". Entity 336, however, may represent a particular operator of equipment entities 332 and 334. The relationships between entities may be directional, as shown by the arrows in FIG. 3. The relationships across baseline, domain-specific, and implementation-specific entities, such as relationships 340 and 350, may be determined from any of the baseline, domain-specific, and implementation-specific data sources.

Figure 4:
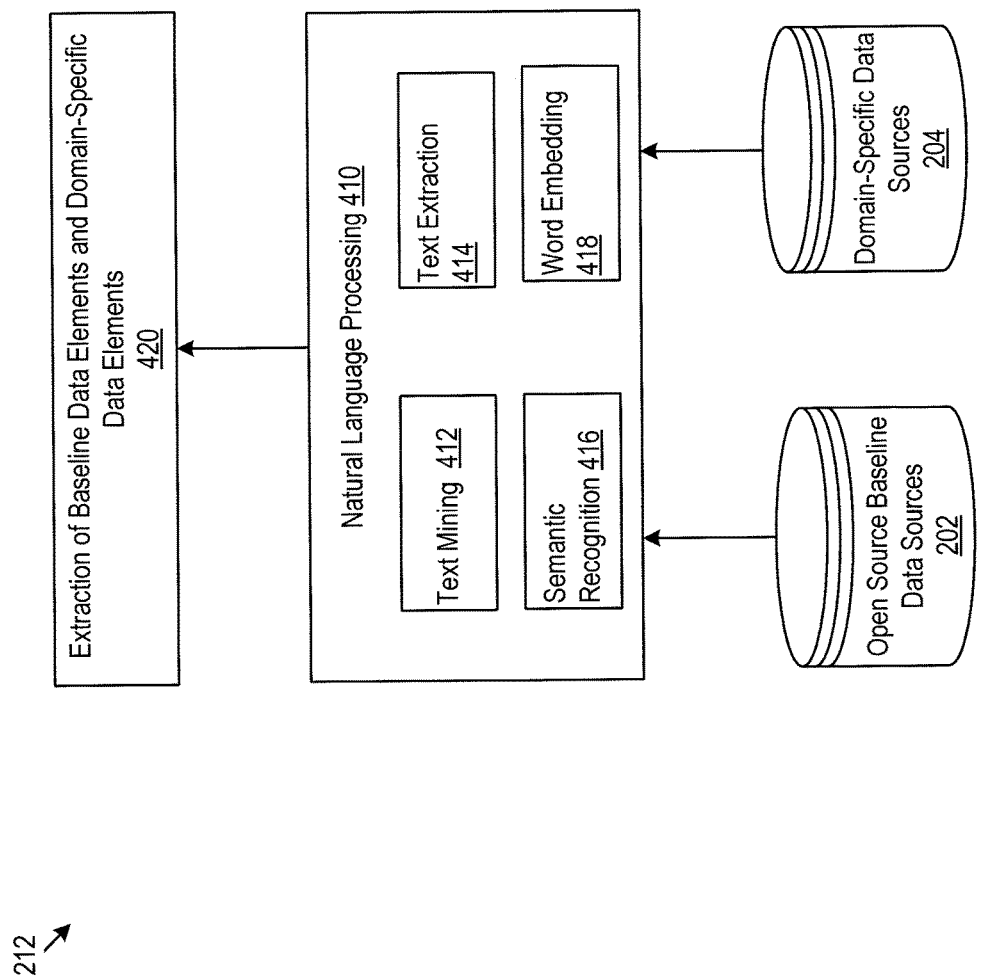
FIG. 4 illustrates an example implementation for extracting baseline and domain-specific data elements from baseline data sources and domain-specific data sources.

FIG. 4 illustrates an example implementation of the process 212 of FIG. 2 for extracting baseline and domain-specific data items from the baseline data sources 202 and the domain-specific data sources 204. The baseline data sources 202 and the domain-specific data sources 204 may be of diverse formats and characteristics. These data sources, for example, may be part of open source knowledge bases, such as Wikidata, Freebase, Dbpedia, YAGO, and Google Knowledge Graph. These data sources may be unstructured. For example, they may be text based. The extraction of baseline and domain-specific industrial data items may thus need to rely on various text analysis and recognition techniques. Correspondingly, the baseline industrial data elements extracted in process 212 may include natural language processing (NLP) 410. Various techniques within the realm of NLP may be relied on. These techniques may be used at various levels of NLP and may be cascaded. For example, an input document may be processed using text mining 412 and/or text extraction 414 techniques to identify texts in the input document. The identified texts may be further analyzed using various semantic recognition techniques 416. Word features in the text, may be, for example, extracted using word embedding techniques 418 for extracting baseline and domain-specific data elements from the text at 420.

Figure 5:
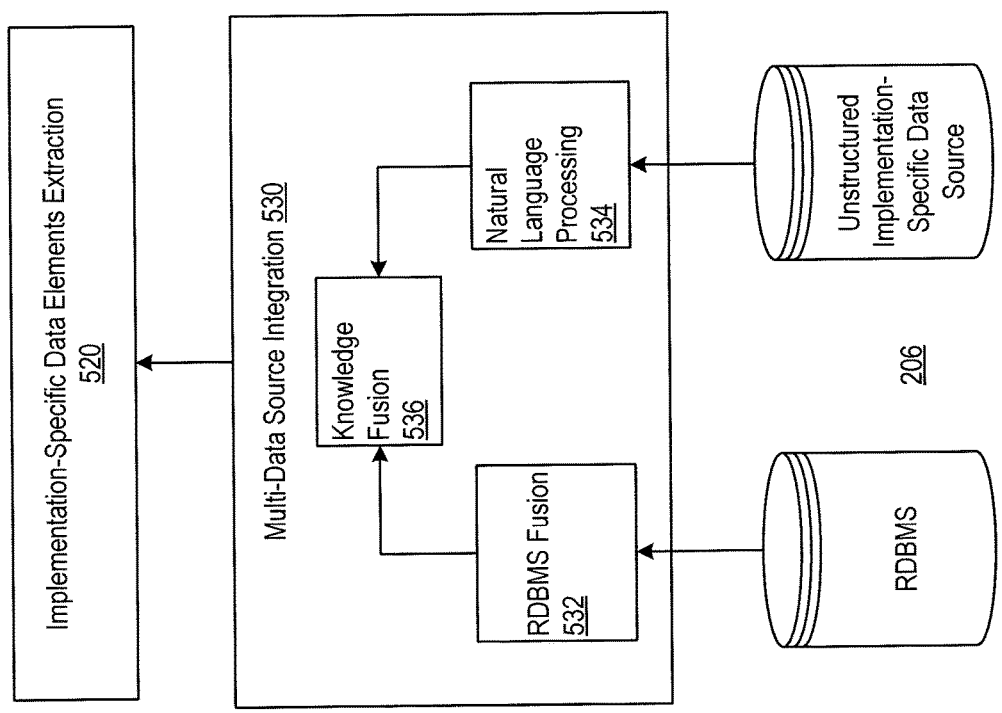
FIG. 5 illustrates an example implementation for extracting implementation-specific data elements from implementation-specific data sources.

FIG. 5 illustrates an example implementation of the process 214 of FIG. 2 for extracting implementation-specific data elements from the implementation-specific data sources 206. The implementation-specific data sources may be maintained by various organizations of the plant either internally or via third party data service providers. These data sources may be structured or unstructured. Structured implementation-specific data sources, for example, may be maintained in the form of a relational database management system (RDBMS) or other types of database systems. Unstructured implementation-specific data sources, for example, may be maintained in the forms of documents (e.g., operation manuals and other notes), videos, and images.

These implementation-specific data sources may be analyzed using a multi-data source integration process 530 for extracting implementation-specific data elements at 520. The multi-data source integration process 530, for example, may include RDBMS fusion 532 for analyzing structured data sources, natural language processing 534 for analyzing unstructured data sources, and knowledge fusion process 536 for integrating analysis from the structured and unstructured data sources. The RDBMS fusion 532 may be used to combine various relational database systems and other database systems for extracting implementation-specific data elements. The natural language processing 534 may be similar in function to the natural language processing 410 of FIG. 5 and is used to extract implementation-specific data elements from unstructured implementation-specific documents, manuals, and notes. The knowledge fusion process 536 may be responsible for integrating the data elements from the RDBMS fusion 532 and the natural language processing 534. For example, relationships between the data elements identified across the two processes may be extracted and discovered.

Once the baseline, domain-specific, and implementation-specific data elements are extracted according to, e.g. FIGS. 4 and 5, the corresponding baseline, domain-specific, and implementation-specific entities in the customized industrial knowledge base may then be derived. Further, the baseline, domain-specific, and implementation-specific entities may be organized in categories in the customized industrial graph knowledge base for providing more efficient data services. Appropriate organization and categorization of these entities may depend on the nature and characteristics of the industry. A categorization scheme may thus be predetermined based on the characteristics of the specific industrial setting and industrial plant. As such, these categories may be referred to as industry-specific categories. These predefined categories may be designed to capture a sufficient set of dimensions of entities suitable for forming the customized industrial knowledge base for describing the entire operation of the plant.

Figure 6:
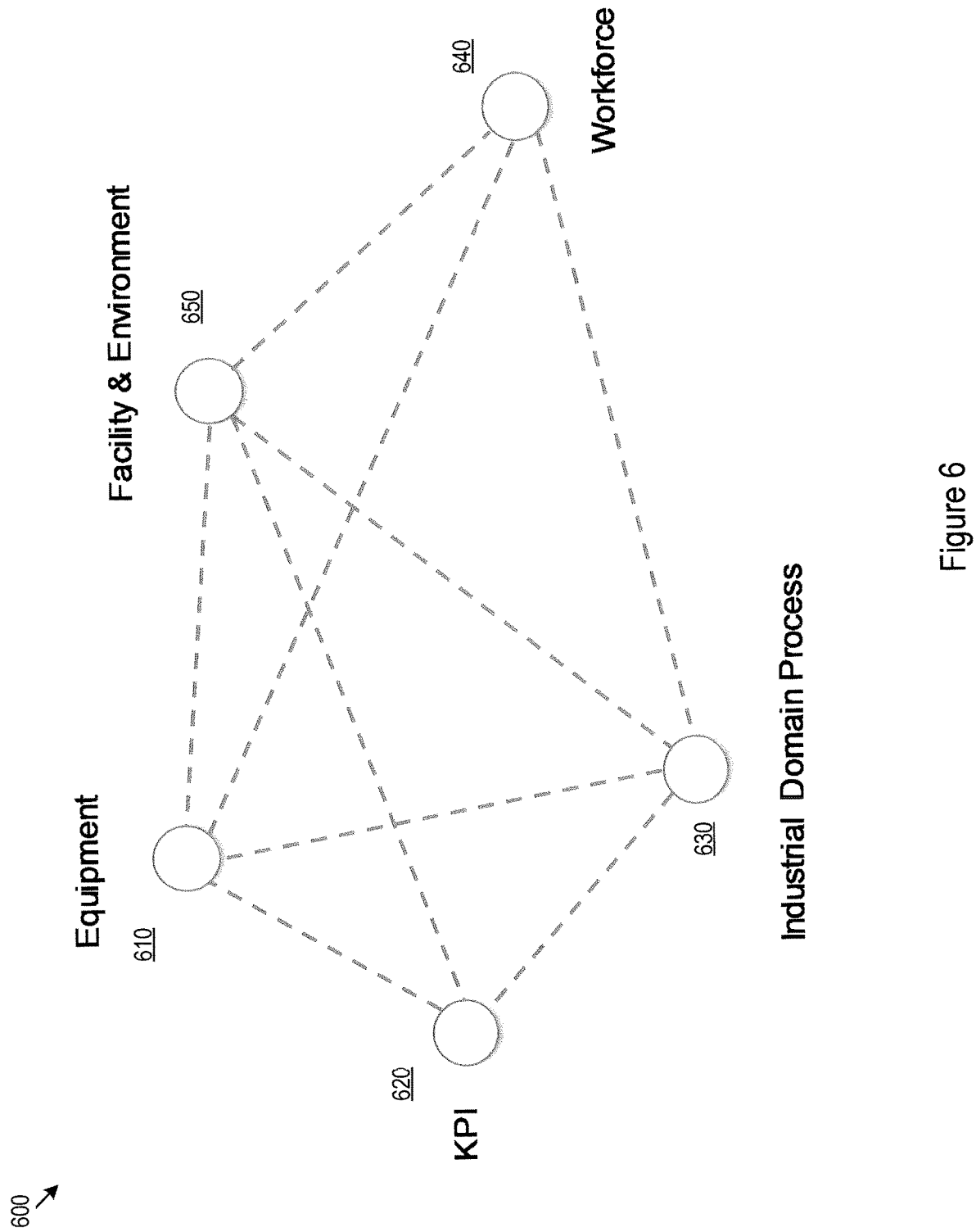
FIG. 6 illustrates a predefined categorization scheme for entities of a specific industrial operation.

FIG. 6 illustrates an example categorization scheme predefined for a specific petroleum refinery plant. Under this example scheme, the operation of the refinery plant may be described by entities belonging to five categories including equipment 610, Key Performance Indicator (KPI) 620, industrial domain process 630, workforce 640, and facility and environment 650. These categories for the entities may be alternatively referred to as dimensions. Accordingly, each entity belongs to a particular dimension among the predefined dimensions.

Once the categorization scheme is defined, a set of rules and classification algorithms may be established for identifying and assigning entities into an appropriate category among the predefined categories. Categories of some of the entities may be embedded explicitly in the data source itself. For example, entities extracted from a database for organizational chart of the plant may be assigned to the workforce category. For another example, these rules and classification algorithms, for example, may be based on models developed using machine learning techniques and may be applied when extracting or after extracting entities from various baseline, domain-specific, and implementation-specific data sources. In particularly, a classifier may be developed based on various machine learning algorithms, the entities may be input in the model and be classified among one of the predefined set of categories. The corpus of labeled training and testing data for developing the classifier model may, for example, be taken from other similar industrial settings with entities already labeled. Alternatively, these rules and classification algorithms may be used in the data element extraction processes 212 and 214 of FIGS. 4 and 5 for baseline, domain-specific, and implementation-specific data elements. In other words, the data elements may be classified into the predefined categories before entities are extracted from the data items.

Figure 7:
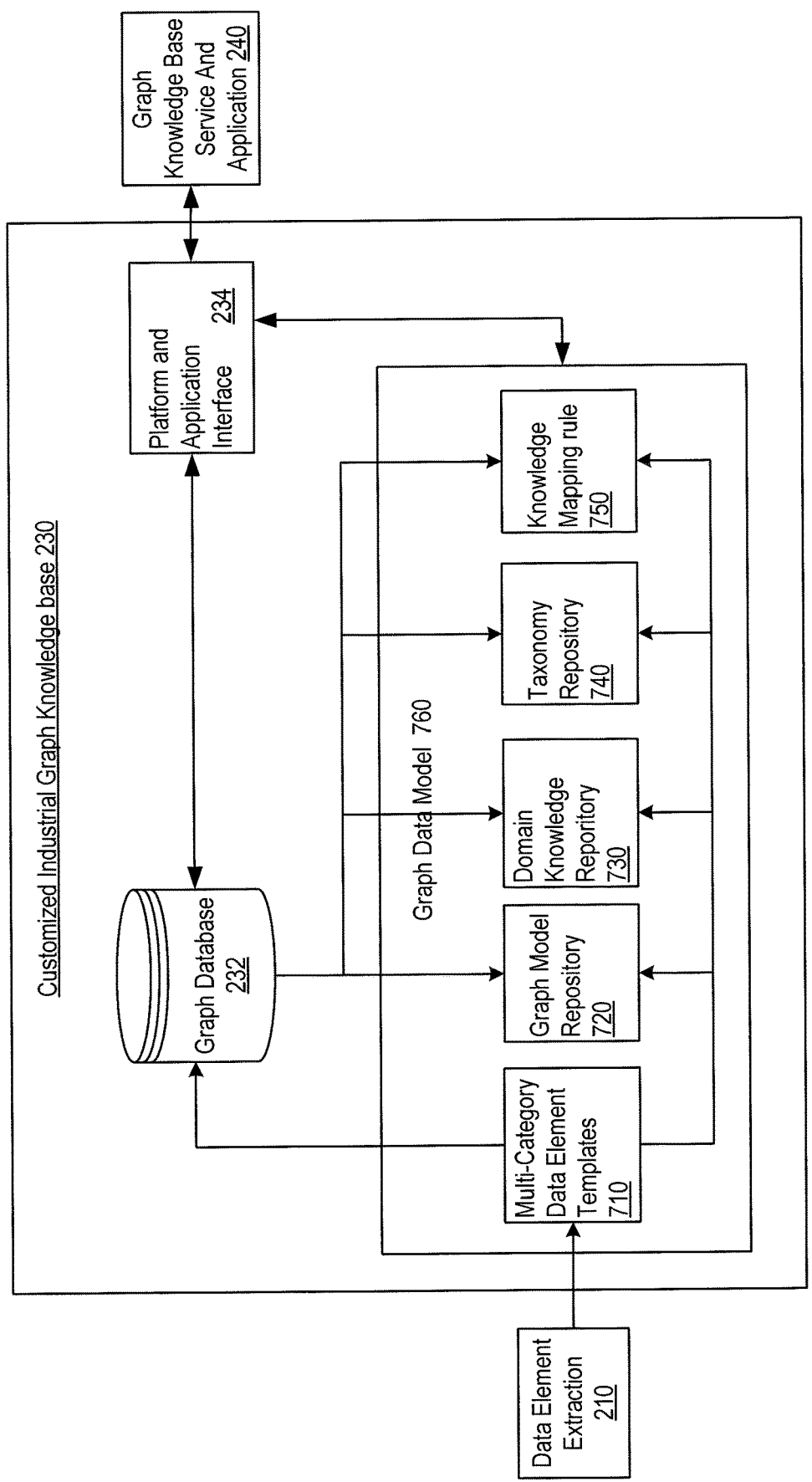
FIG. 7 shows an example implementation for building the customized industrial graph knowledge base from the data elements extracted from the baseline, domain-specific, and implementation-specific data sources.

FIG. 7 shows an example implementation for building the customized industrial graph knowledge base from the data elements extracted from the baseline, domain-specific, and implementation-specific data sources. The extracted data elements at 210 may be used to establish a graph data model 760. The graph data model 760 may include multi-category data templates each for one of the predefined categories, as shown in 710. Entities and relationships may then be extracted from the data templates 710 and stored in the graph database 232. From either the data templates or the graph database, various data repositories of the graph data model 760 may be derived, including but not limited to a graph model repository 720, a domain knowledge repository 730, a taxonomy repository 740, and a knowledge mapping rule repository 750. These data repositories may be derived from the graph database 232 and the data templates 710 by the system circuitry 104 of FIG. 1 and may be stored, for example, in storage 109 of FIG. 1.

The graph model repository 720 may store a graphic representation of the entities and relationships contained in the graph database. For example, the graphic representation stored in the graph model repository 720 may be in the form of Scalable Vector Graphics (SVG). The SVG model may be XML-based and may support interactivity and animation. The SVG model may be directly supported by and viewed on a web browser. The domain knowledge repository may include extracted intermediate knowledge and correlations of the data in the graph database. The taxonomy repository 740 keeps track of the names of nodes using taxonomy format. For example, information can be extracted from the above three various data sources and is reorganized and clustered into categories and subcategories, creating a taxonomy repository 740. In one implementation, multiple independent taxonomies can be overlaid to provide different views into the same data. For example, a database of equipment could have separate facets organized by manufacturer, production process, operation status etc. Users may create or modify the labels of entities, redefine the information of entities in the taxonomy repository via a taxonomy management tool/software and interface. The taxonomy repository 740 and the corresponding taxonomy management tools/software can be further used to reduce time, labor, and potential inconsistencies in creating, implementing, and maintaining the taxonomy. The knowledge mapping rule repository 750 keeps track of rules used in the graph data modeling. Particularly, to create an industrial knowledge graph, the extracted entities should be linked via various rules. These rules are extracted from the data sources and maintained in the knowledge mapping rule repository 750.

These intermediate data repositories represent various facets of the graph database and may be used for achieving fast access to the graph database. They may be updated from time to time as needed. Accordingly, data services may be provided to external applications (240 of FIG. 7) via the platform and application interface 234 by both the graph database 232, the data templates 710, and the other data repositories such as 720, 730, 740, and 750 of the graph data model 760.

Figure 8:
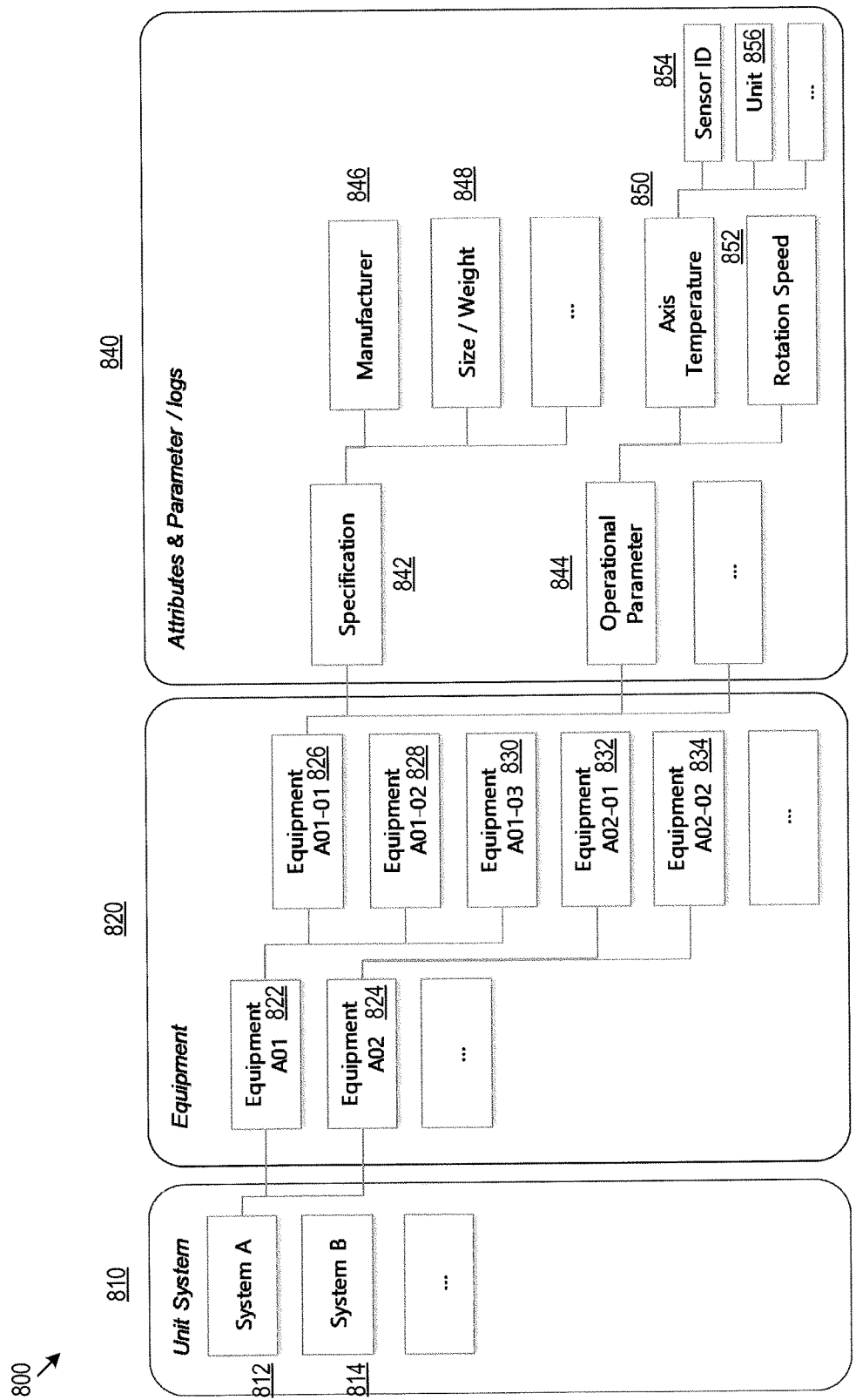
FIG. 8 illustrates an example data template for data elements belonging to the equipment category for a specific petroleum refinery plant.

FIG. 8 illustrates an example data template 800 for data elements belonging to the equipment category for the specific petroleum refinery plant. Data elements in the equipment data template may be organized in multiple levels, as shown by unit system level (810), equipment level (820), and attributes and parameter level (840) illustrated in FIG. 8. Unit system level 810 may include various systems, such as 812 and 814, of the petroleum refinery plant. System 812, for example may denote the vacuum distillation system and system 814 may denote a catalytic reformer system of the petroleum plant. Each of the systems may include various equipment. For example, the vacuum distillation system 812 may include a furnace 822, and a pump assembly 824. Each of the levels 820 and 840 may in turn be organized as a hierarchy. For example, the furnace 822 may contain sub equipment 826, 828, and 830, and the pump assembly 824 may include sub equipment 832 and 834. Likewise, each equipment may be characterized by a set of attributes and types of parameters, such as specification 842 and operational parameter 844. The specification of an equipment may include parameters such as manufacturer 846, size/weight 848 and the like. Operational parameter 844 may further contains a hierarchical set of parameters 850, 852, 854, and 856.

Figure 9:
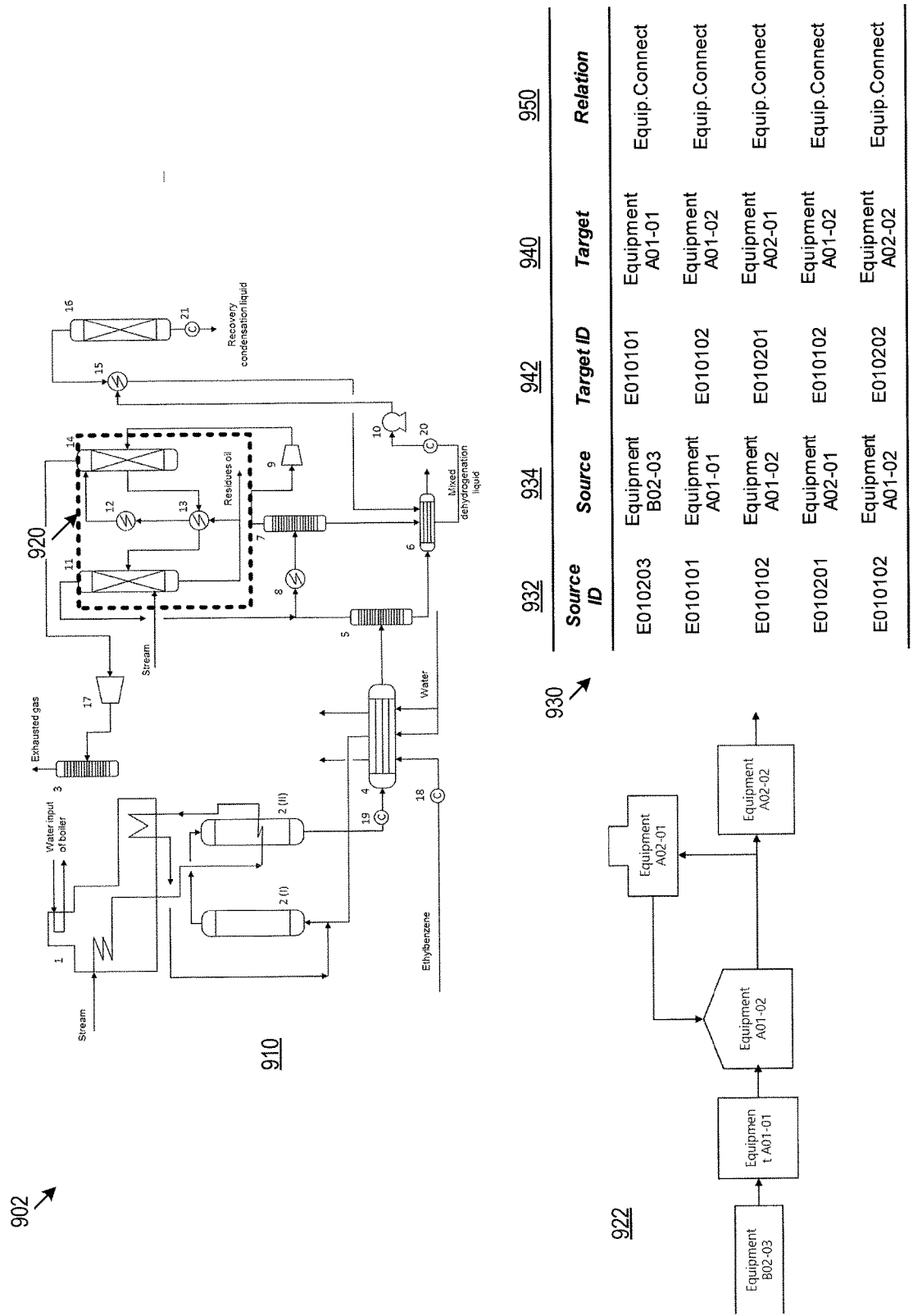
FIG. 9 illustrates an example domain process diagram and an excerpt of an example data template for data elements belonging to the industrial domain process category for the specific petroleum refinery plant.

FIG. 9 illustrates an example domain process diagram 902 for the petroleum plant and an excerpt of an example domain process data template 930 for data elements belonging to the industrial domain process category. The entire process flow of the petroleum plant is shown by 910. The process flow 910 may be divided into various component processes or sections. For example, component process 920 (enclosed by the dashed box) may be related to a particular processing section of the refinery plant. The connectivity between various equipment involved in component process 920 may be extracted, as shown by 922. The arrows in 910, 920, and 922 may represent the direction of material flow. The example domain process data template 930 may include pairs of source and destination equipment 934 and 940, and their relationships 950. Each equipment may be identified by a unique ID as shown in 932 and 942. In one implementation, the IDs for the equipment may be constructed to identify the component process in which the equipment is used. For example, the first portion of the equipment IDs 932 and 942 contains "E010", indicating that these pieces of equipment all belong to the component process 920.

Figure 10:
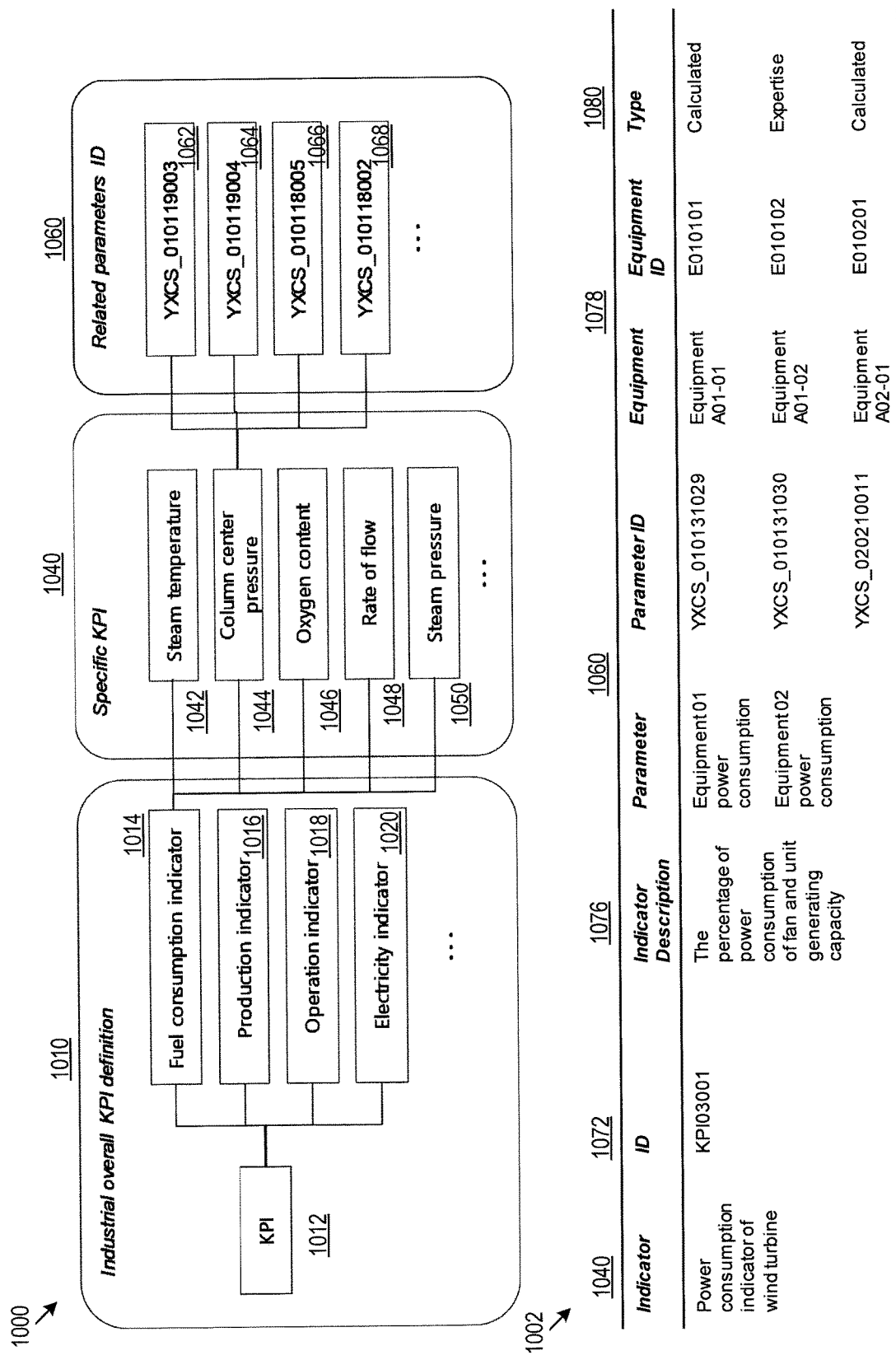
FIG. 10 illustrates an example data template for data elements belonging to the key performance indicator category for the specific petroleum refinery plant.

FIG. 10 illustrates an example hierarchical KPI structure 1000 and a corresponding data template 1002 for data elements belonging to the KPI category for the specific petroleum refinery plant. The KPI data elements may be organized in multiple levels, as shown by the industrial overall KPI level 1010, the specific KPI indicator level 1040, and the parameters level 1060. The industrial overall KPI level 1010 contains KPI indicators 1012 for measuring the operation performance of the petroleum plant. These KPI indicators may, for example, include fuel consumption indicator 1014, production indictor 1016 (there may be multiple indicators of this kind for measuring production of various intermediate and final products), operation indicator 1018, and electricity indicator 1020. Each of these overall indicators may include a set of specific KPI indicators 1040. For example, the fuel consumption indicator 1014 may be a combination of steam temperature indicator 1042, a column center pressure indicator 1044, an oxygen content indicator 1046, a rate flow indicator 1048, and a steam pressure indicator 1050. Each of these specific KIP indicators may in turn be related to a set of parameters 1060. For example, the column center pressure indicator 1044 may be related to or determined by parameters 1062, 1064, 1066, and 1068.

The tabulated data template 1002 for data elements belonging to the KPI category for the specific petroleum refinery may be established correspondingly. Each specific KPI indicator 1040 may be assigned unique ID 1072. The data template may include a description 1076 for each specific KPI indicator 1040. The parameters 1060 for each specific indicator may include a pair of description and parameter ID as shown by 1060 in the data template. Each of these parameters may correspond to an equipment represented by a pair of equipment description and ID, as shown by 1078 in the data template. Further, each of the KPI indicator may either be calculated based on parameters 1060 or estimated by domain experts, as indicated by the column 1080 of the data template.

Figure 11:
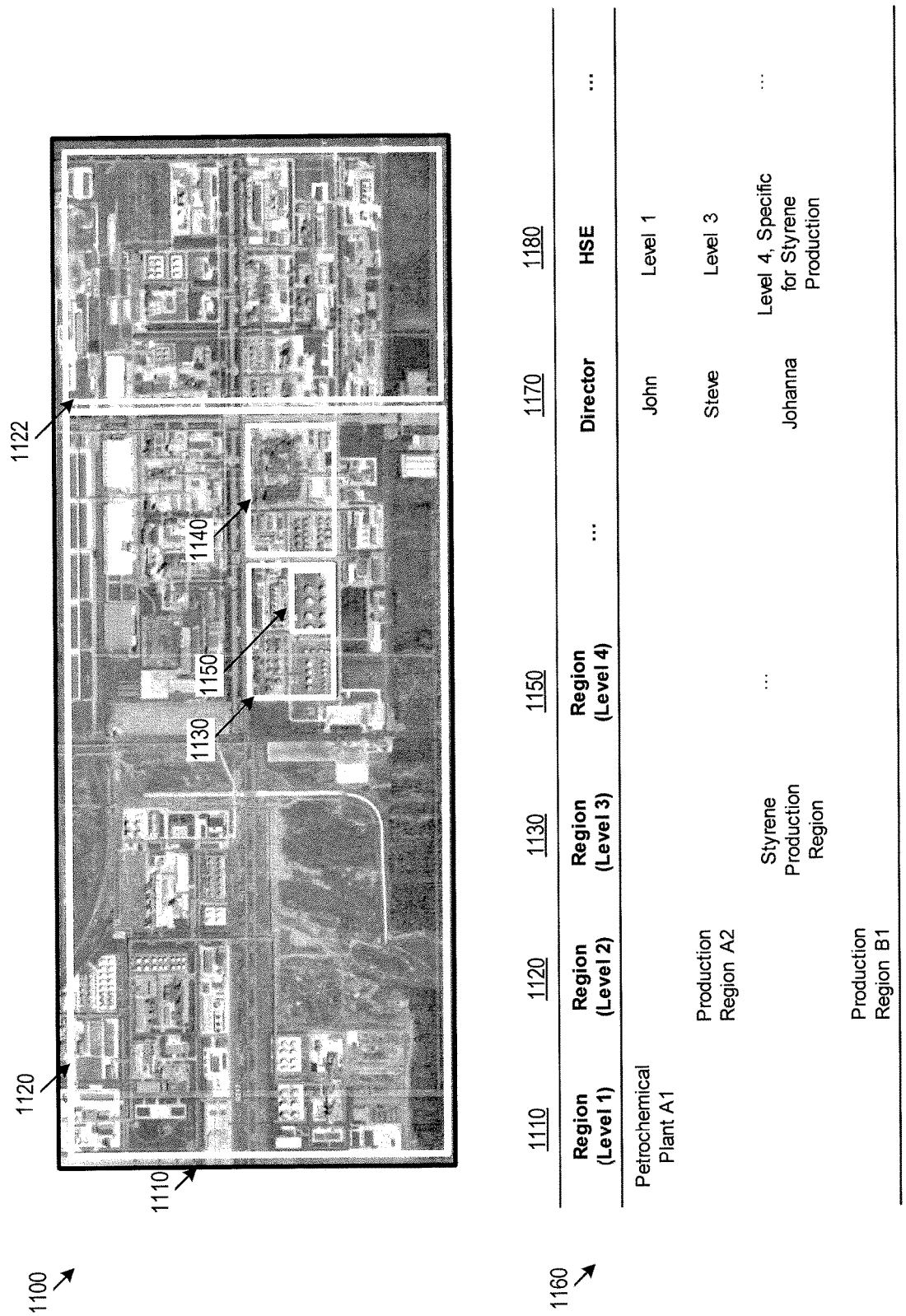
FIG. 11 illustrates an example facility map of the specific petroleum refinery plant and an example data template for data elements belonging to the facility and environment category for the specific petroleum refinery plant.

FIG. 11 shows an example facility diagram 1100 of the specific petroleum refinery plant and an example data template 1160 for data elements belonging to the facility and environment category for the specific petroleum refinery plant. The facility and environment structure of the refinery plant may be hierarchical. For example, the entire plant 1110 or level 1 region may include multiple level 2 regions, such as regions 1120 and 1122. The level 2 region 1120 may include multiple level 3 regions, such as regions 1130 and 1140. A level 3 region may further include level 4 regions (e.g., region 1130 includes level 4 region 1150) and so on. A maximum number of levels may be predetermined. Such hierarchy of regions may be accordingly tabulated in the facility and environment data template 1160. The data template 1160 further include directors for each region in each level, as shown by 1170, and a Health Safety and Environment (HSE) level for each region, as shown by 1180.

Figure 12:
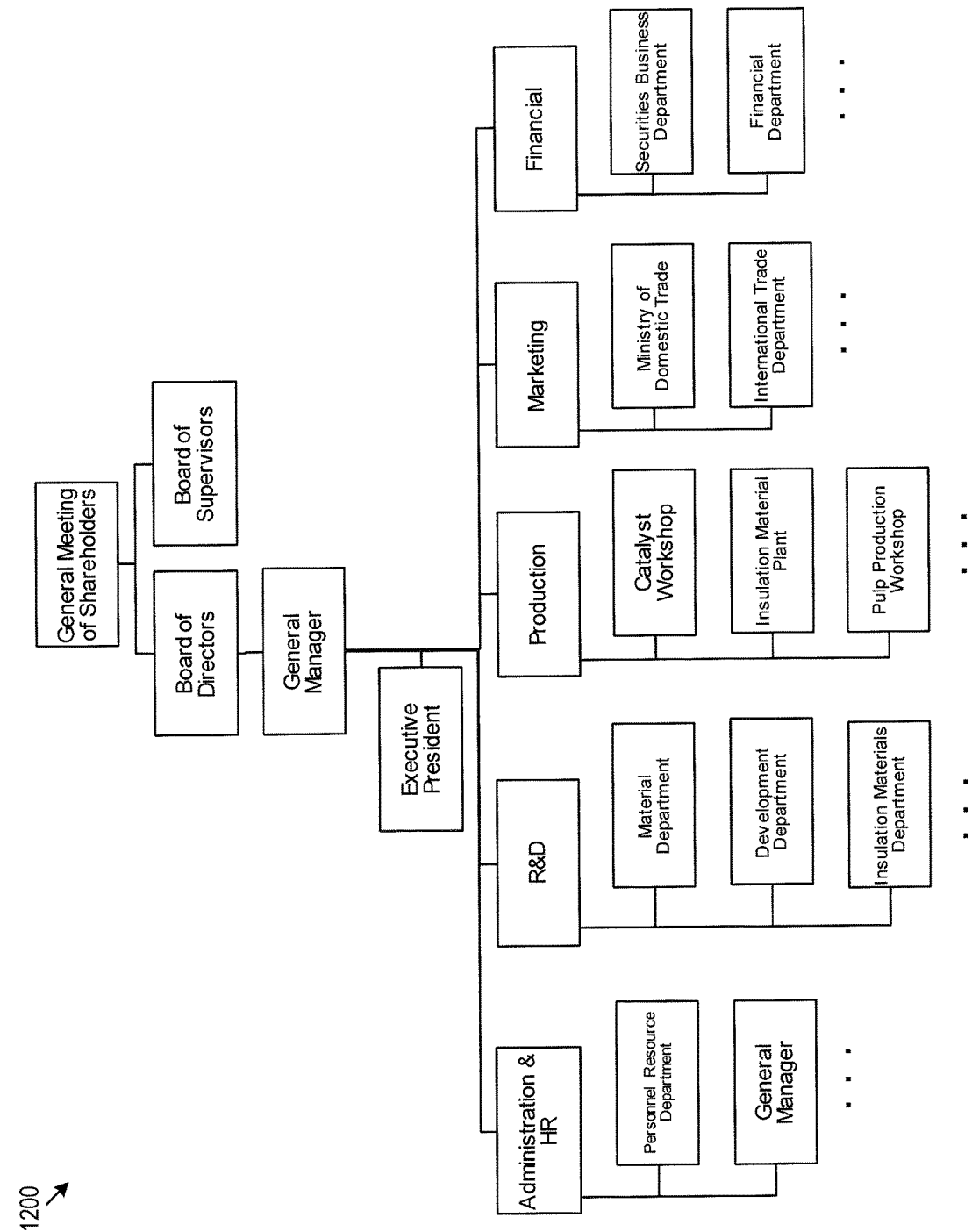
FIG. 12 illustrates an example data template for data elements belonging to the workforce category for the specific petroleum refinery plant.

FIG. 12 illustrates an example data template for data elements belonging to the workforce category for the specific petroleum refinery plant. The workforce data template may be extracted from organization charts of the refinery plant. These organization charts, for example, may be originally stored in a relational database. The data template for workforce data elements maybe organized, for example, in a tree data structure.

The extracted entities of the five categories predefined in FIG. 6 and the corresponding data templates of FIG. 8 to FIG. 12 may each be tagged with its category. The category tags may be stored for each entity in the graph database as a property of the entity. As such, queries into the graph database may be conducted conveniently within any of the predefined categories.

Entities in the predefined categories may be related to each other via intra-category (or intra-dimensional) or inter-category (or inter-dimensional) relationships. Intra-category relationships refer to relationships between entities belonging to the same category. Inter-category relationships, on the other hand, refer to relationships between entities across categories, as shown by the dashed lines in FIG. 6. The inter-category relationships may be embedded in the data templates of FIG. 8 to FIG. 12. For example, equipment may be connected to a KPI indicator across categories and such inter-category relationships may be indicated by columns 1040 and 1078 of FIG. 10 for the data template for the category of KPI. The inter-category relationships between entries across categories may be of limited number of types. The limited number of types of relationships may be extracted from the data templates in FIG. 8 through FIG. 12. Relationship between any two entities across categories may belong to one of the limited number of types of inter-category relationships.

Figure 13:
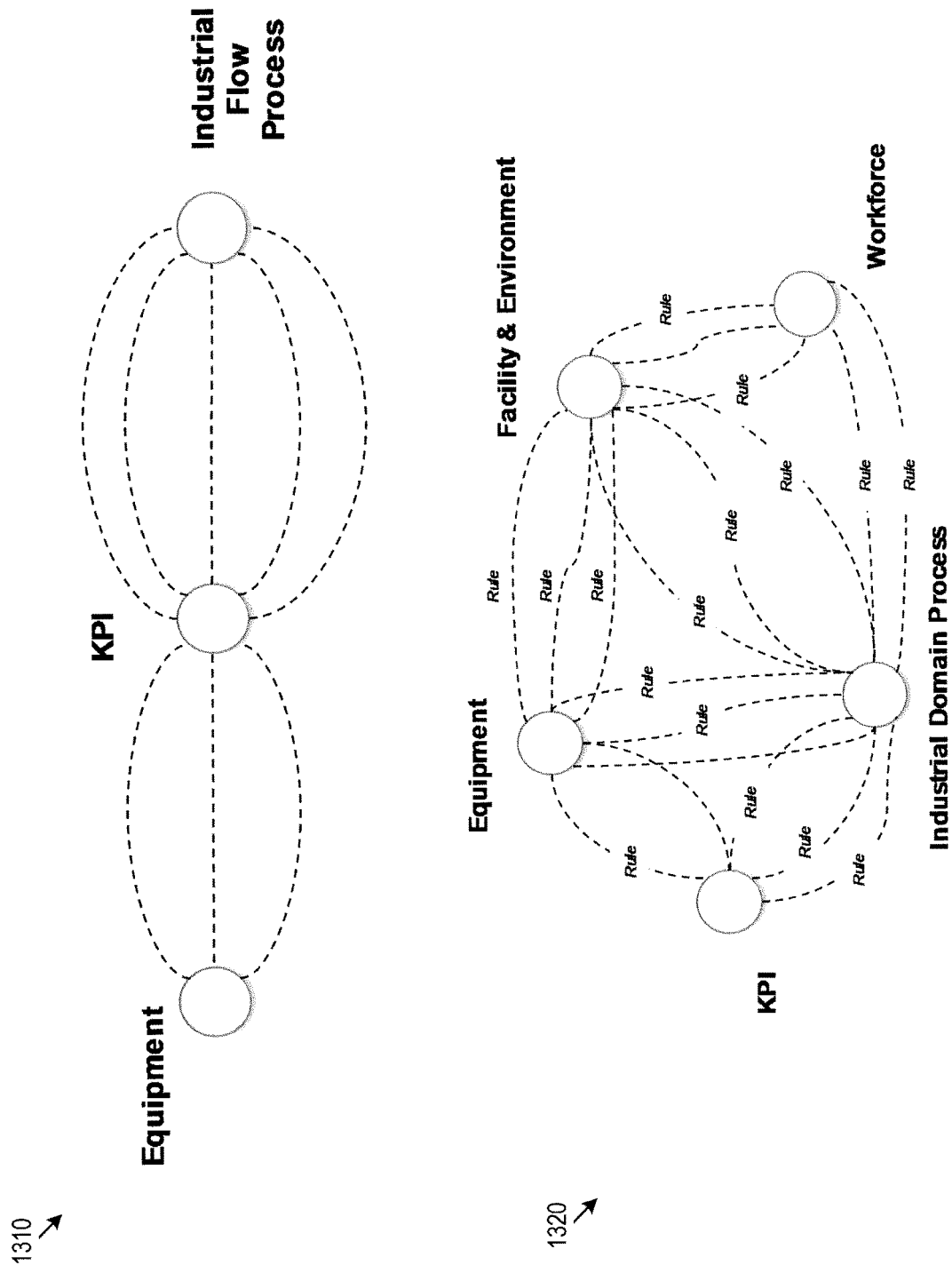
FIG. 13 shows exemplary types of inter-category relationships.

FIG. 13 shows a set of extracted types of inter-category relationships. In particularly, 1310 of FIG. 13 illustrates types of relationships between one of the categories (KPI) and all other categories. Merely as an example and for illustrative purposes, it may be extracted from the data templates of FIG. 8 to FIG. 12 that entities within the KPI categories are directed related to entities in categories equipment and industrial flow process. The relationships between KPI with other categories may be indirect or may not be explicitly reflected in the data templates. Once the types of inter-category relationships for each category with other categories are determined from the data template, an overall picture for the types of inter-category relationships may be established as shown in 1320 of FIG. 13.

Each edge in the graph database may accordingly be associated with a tag indicating whether the relationship represented by the edge is intra-category or inter-category. Such a tag may be stored as a property for the edge in the graph database. The tag may be convenient used in querying processes for filtering query results into relationships that are of only the intra-category type or of only the inter-category type.

The entities and relationships are stored as nodes and edges in the graphic database. Because the graph database is customized to the specific industrial operation or plant, the graph database may be referred to as an industry-specific graph database. Correspondingly, the graph structural components of the customized graph database may be referred to as industry-specific graph structural components. The nodes in the graph database may be referred to as industry-specific entities accordingly.

In a typical plant, entities and relationships may be of varying importance to the operation of the plant. The importance of each entity and relationship may be quantified as a weight value and used as a filtering parameter for screening unimportant entities and relationship in processing a query to the graph database. Each entity or relationship in the graph database for the plant may thus be associated with a filtering parameter used as an indicator of the importance of the entity or relationship. Such a filtering parameter may be stored in the graph database as, for example, a property associated with the entity or relationship. The filtering parameter may be normalized to a predefined scale. The scales for entities and for relationships may be unified or may be independently defined as separate scales. In another implementation, the scales for entities or relationships may be independently defined within each category or dimension.

Figure 14:
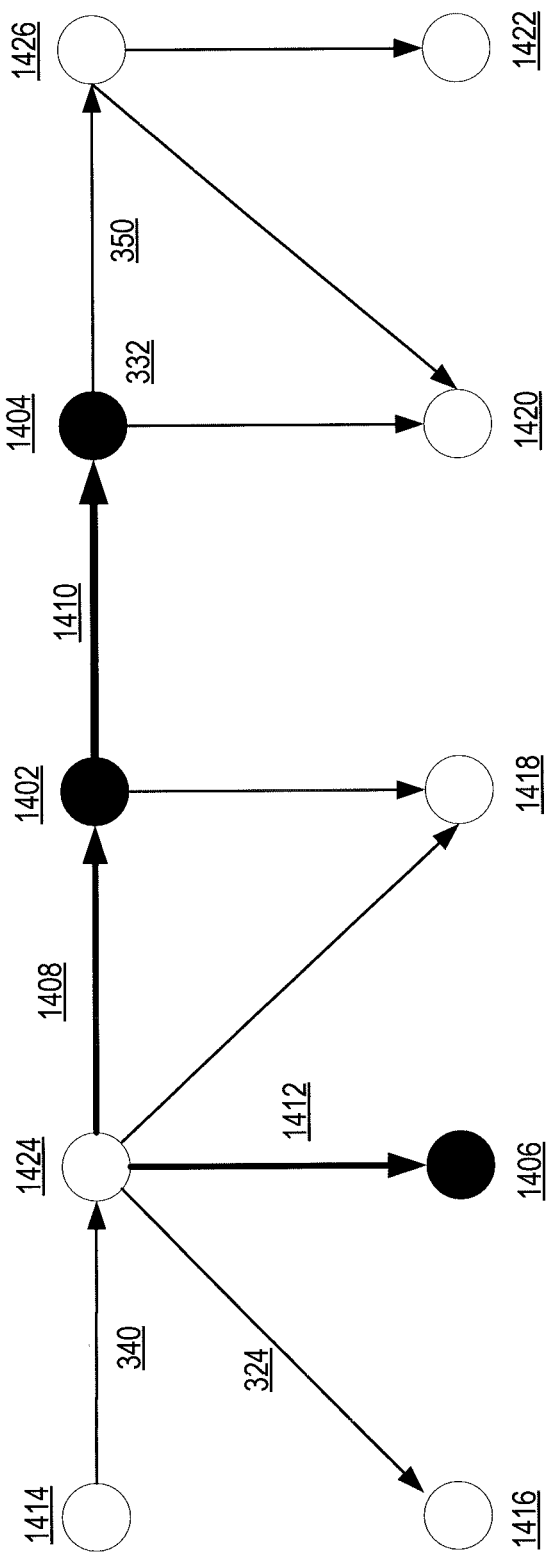
FIG. 14 shows an example scheme for using predefined filtering parameters for a small set of entities and nodes to estimate filtering parameters for entities and relationships of the entire graph database.

In one implementation, as shown in FIG. 14, the filtering parameters for a subset of entities and relationships of the graph database may be known via, estimation according to historical operation of the plant. For example, some critical entities and relationships such as entities 1402, 1404, 1406 and relationships 1408, 1410, and 1412 may be known to be critical for a particular KPI from past operation experience. Because the graph database inherently contains networks of interrelation between a network of large number nodes, filtering parameters for those nodes and edges with unknown filtering parameters (such as the rest of the nodes and edges in FIG. 14) may be estimated from the known filtering parameters of the subset of entities and relationships. Such estimation may be based on various graph probability models. As such, the filtering parameters may be alternatively referred to as a composite filtering parameter. It is composite because it represents an importance value of the corresponding nodes or edge derived by combining information contained in the entire network of entities and relationships.

For an example probability model, let $\varepsilon = \{e_1, e_2, \ldots e_{N_e}\}$ be the set of all entities and $\mathcal{R} = \{r_1, r_2, \ldots, r_{N_r}\}$ be the set of all relationships in the customized industrial graph knowledge base, where $N_e$ represents the number of entities, $N_r$ represents the number of relationships. Then $x_{ijk} = (e_i, e_j, r_k)$ may be defined to denote each possible entity-relationship-entity combination in the space of $\varepsilon \times \mathcal{R} \times \varepsilon$. All possible triples in $\varepsilon \times \mathcal{R} \times \varepsilon$ can be grouped in a third-order space $\underline{Y} \in \{0, 1\}^{N_e \times N_r \times N_e}$. A binary variable $y_{ijk} \in \{0, 1\}$ may be defined as, $$y_{ijk} = \begin{cases} 1 & \text{if the triplet } (e_i, e_j, r_k) \text{ exists} \\ 0 & \text{otherwise} \end{cases}$$

The example probability model predicts the existence of a triple $x_{ijk}$ via a score function $f(x_{ijk}; \Theta)$ that represents the model's confidence given a $\Theta$ parameter. The score function may be defined in many different ways. For example, the score function may be defined using a binary model and a multi-layer perception model. The example probability model may be written as:

$$P(\underline{Y}|D,\Theta) = \Pi_{i=1}^{N_e} \Pi_{j=1}^{N_e} \Pi_{k=1}^{N_r} g(y_{ijk}|\sigma(f(x_{ijk};\Theta))),$$

where $\sigma(u) = 1/(1+e^{-u})$ is the logistic function, subset $D \subseteq \varepsilon \times \mathcal{R} \times \varepsilon \times \{0, 1\}$, and $$g(y \mid p) \approx \begin{cases} p & \text{if } y = 1 \\ 1 - p & \text{if } y = 0 \end{cases}$$

is the Bernoulli distribution.

Probability of the nodes and relationships $P(\underline{Y}|D, \Theta)$ may be calculated to determine the importance of the nodes and relationships. A determination function may be defined as:

$$\hat{f}(x|P(\underline{Y}|D, \Theta)) = \begin{cases} \text{low} & \text{If } P \in \{0, a\} \\ \text{normal} & \text{If } P \in \{a, b\} \\ \text{high} & \text{If } P \in \{b, \infty\} \end{cases}$$

The probability of the nodes and relationships may thus be used as the filtering parameter. The range of values for the filtering parameter of the entities and relationships may be divided into a number of predetermined levels, as shown above. For example, the filtering parameter may range from 0 and up and the range may be divided into $\{0, a\}$, $\{a, b\}$, and $\{b, \infty\}$, representing low, normal, and high importance, respectively. The values for a and b may be predefined as, e.g., 5 and 10. In one implementation, entities and relationships of low importance may be removed from the graph database and various intermediate data repositories, particularly when the customized industrial knowledge base becomes exceedingly large.

The customized industrial knowledge base above thus integrates a multi-dimensional graph database with various intermediate data depositories and an application interface for efficient processing of input queries. The nodes and edges of the graph database representing entities and relationships between the entities in a specific industrial operation are associated with a filtering parameter indicating an importance of the entities and relationships to the specific industrial operation. Such a customized graph industrial knowledge based is built by extracting entities and relationships from various baseline, domain-specific, and implementation-specific data sources.

Figure 15:
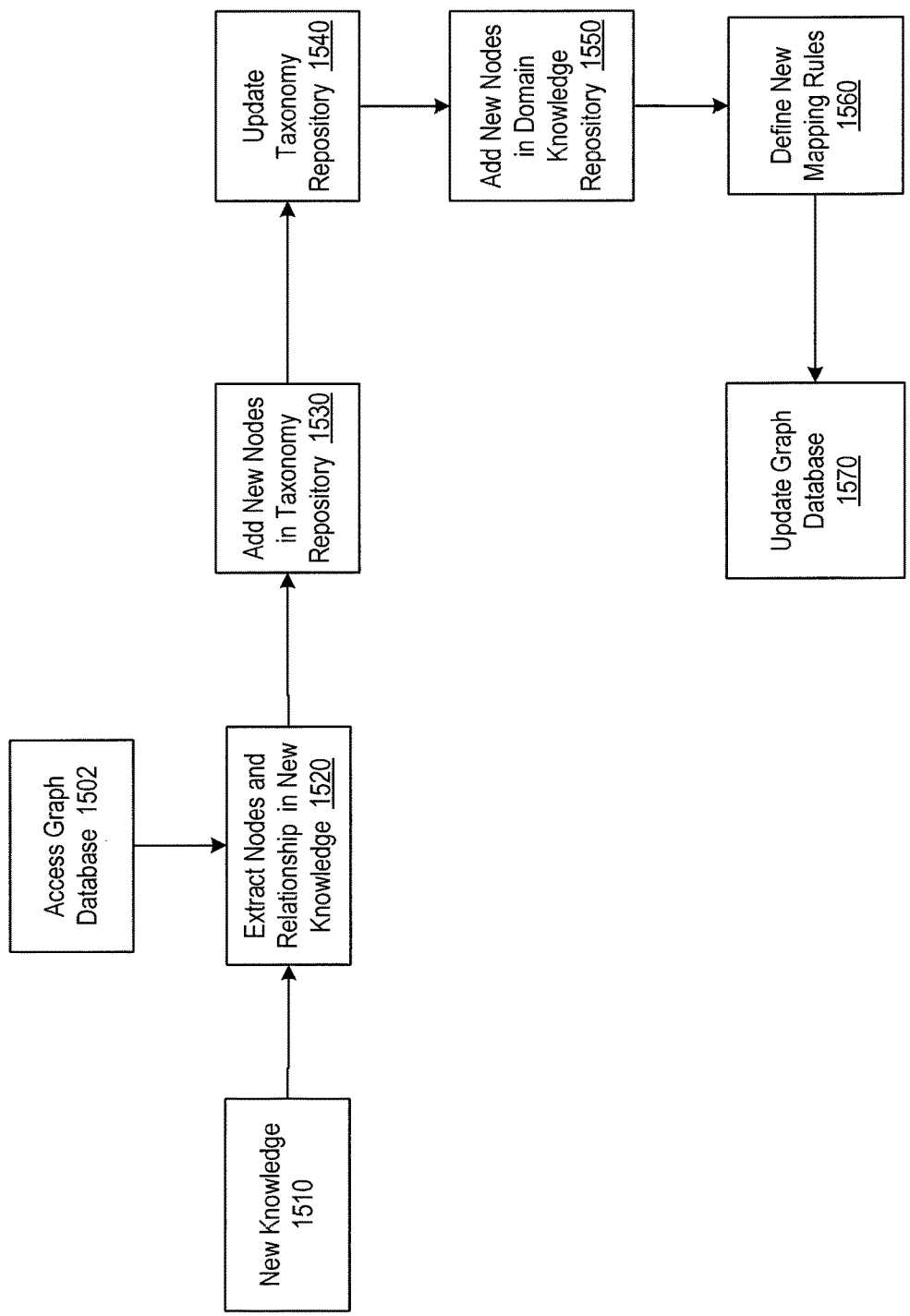
FIG. 15 illustrates a logic flow for updating the customized industrial graph knowledge base with externally obtained new knowledge.

The customized industrial graph knowledge base may be updated as new knowledge is gained. For example, FIG. 15 illustrates a logic flow for updating the knowledge base when knowledge 1510 external to the current industrial knowledge base is introduced. The external new knowledge may be introduced from supplemental information via updates in any of the baseline, domain-specific, and implementation-specific data sources. For example, new equipment may be purchased and installed, existing equipment may be upgraded, operation manuals may be updated, and new facilities may be built. This supplemental information may be analyzed for extracting supplemental data elements, from which new nodes and new relationships may be extracted in 1520. Extraction of new nodes (entities) and relationships may be realized using approaches similar to those illustrated in FIGS. 4-6. Whether the extracted nodes and relationships is new may be determined by comparing the extracted nodes and relationships with the current graph database 1502. The new nodes is then added to the taxonomy repository (1530). The addition of the nodes to the taxonomy may further lead to reorganization and updating of the taxonomy repository (1540). The new nodes may further be added to the domain knowledge repository (1550). New mapping rules may be developed based on the new nodes and new relationships and added to the knowledge mapping rule repository (1560). The new nodes may further be added to the graph database with appropriate categories and the new relationships may be added to the graph database with appropriate inter-category and intra-category designation (1570).

Figure 16:
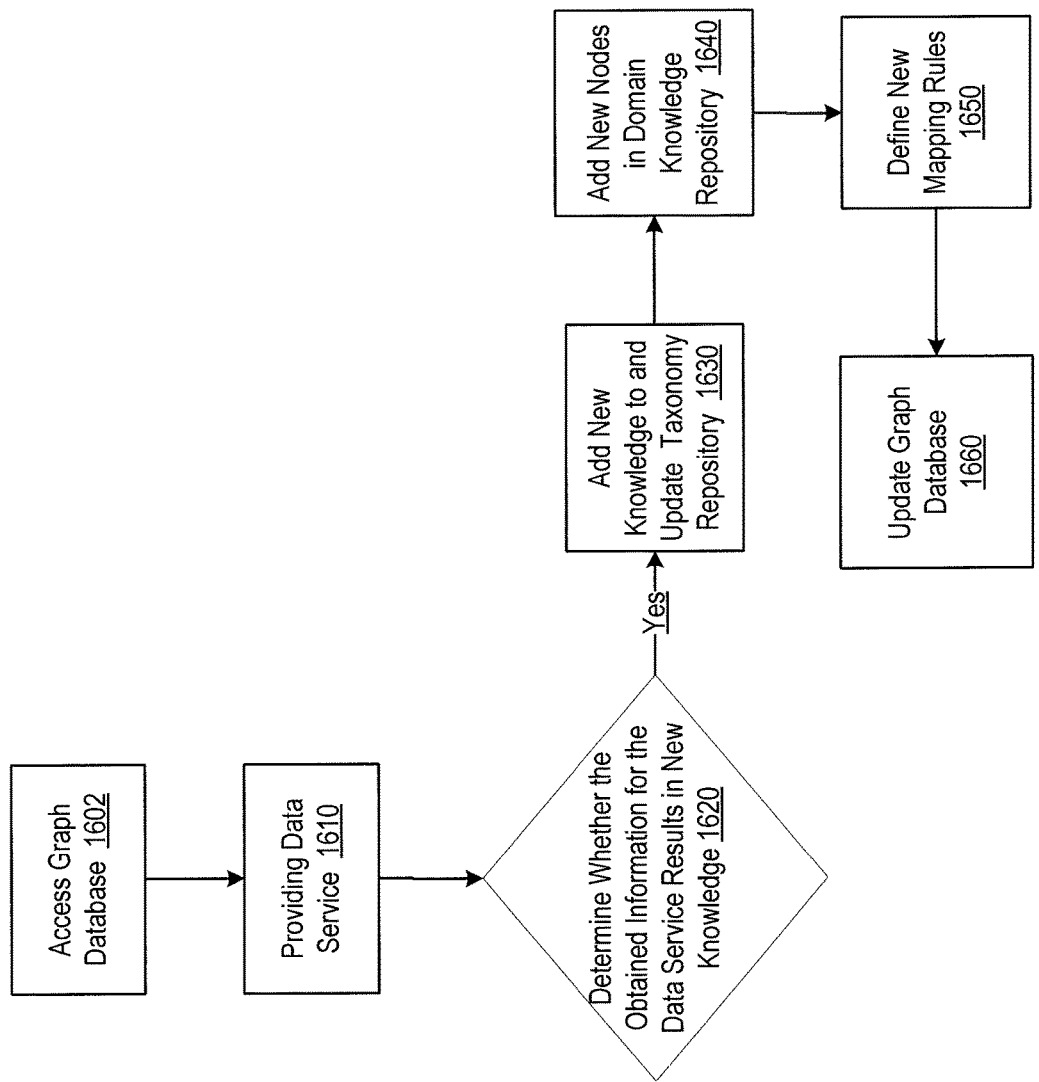
FIG. 16 illustrates a logic flow for updating the customized industrial graph knowledge base with new knowledge derived while providing data services.

For another example, FIG. 16 illustrates a logic flow for updating the knowledge base when knowledge 1510 internal to the current industrial knowledge base is gained. Such internal knowledge may be inherently embedded in the graph database. However, obtaining such knowledge may involve complex analytics. It is thus advantageous to store such knowledge into an appropriate intermediate data repository as it is gained when providing data services to external applications. In particularly, an external application may access the graph database (1602). The industrial knowledge base then provides data services and conducting data analytics accordingly (1610). From the data services and data analytics, it may be determined whether new knowledge is gained (1620). New knowledge may include new entities and relationships that are derived from analyzing the current graph database while providing data services. If it is determined that new knowledge is gained, an appropriate update of the taxonomy repository may be performed (1630). The new nodes and new relationships may further be added to the domain knowledge repository (1640). New mapping rules may be developed based on the new nodes and new relationships and added to the knowledge mapping rule repository (1650). The new nodes may further be added to the graph database with appropriate categories and the new relationships may be added to the graph database with appropriate inter-category and intra-category designation (1660).

Updating the customized industrial graph knowledge base above may further include determining the filtering parameter for the newly added nodes and relationships and then associating the filtering parameter with the newly added nodes and relationships in the graph database. The filtering parameter (importance value or weight value) for the newly added nodes and relationships may be estimated based on known or previously estimated filtering parameters in the graph database using the probability model discussed above. In one implementation, whether to add the new entity and relationship into the graph database and the various intermediate data repository may be determined by the estimated importance or weight value of the new entity and relationship. For example, if the weight value for the new entity is estimated to be in the low range discussed above, the system circuitry may decide not to include this new entity into the graph database and the intermediate data repositories. Alternatively, a predefined inclusion threshold value for the filtering parameter may be used to determine whether to include the new entity or relationship into the customized industrial graph knowledge base.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
   a graph database comprising graph structural components representing data linked to an industrial operation in an industrial setting for an industrial manufacturing facility, the industrial manufacturing facility being among a plurality of industrial manufacturing facilities in one or more domains;
   a communication interface;
   system circuitry in communication with the graph database and the communication interface, the system circuitry configured to:
      access predefined industry-specific categories with which to tag industry-specific entities associated with the industrial setting and the industrial operation, the industry-specific categories being applicable to the plurality of industrial manufacturing facilities;
      acquire, via the communication interface, baseline industrial data elements associated with manufacturing processes common to the plurality of industrial manufacturing facilities from a first external data source;
      acquire, via the communication interface, domain-specific data elements characterizing the industrial setting of the industrial operation for the industrial manufacturing facility associated with an industrial domain among the one or more domains of the plurality of industrial manufacturing facilities from a second external data source;
      acquire, via the communication interface, implementation-specific data elements collected by the industrial manufacturing facility;
      extract, from the baseline industrial data elements, the domain-specific data elements, and the implementation-specific data elements, data entities with tags for tagging each data entity with a specific category among the predefined industry-specific categories, wherein the tags are generated at data element level and a same tag applies to all entities extracted from a data element and the tags are generated by processing each data element using a pretrained machine learning category classifier;
      extract inter-category relationships between the data entities across the predefined industry-specific categories;
      extract intra-category relationships between the data entities within a selected category among the predefined industry-specific categories;
      store the data entities with the tags, the inter-category relationships, and the intra-category relationships as the graph structural components in the graph database in forms of nodes and edges, wherein the edges are associated with data structures for tagging each of the edges as either an inter-category edge or an intra-category edge; and
      determine a composite filtering parameter for a selected graph structural component in the graph database based on a relationship network of the selected graph structural component with other graph structural components in the graph database and based on composite filtering parameters of the other graph structure components; and
   an application interface in communication with the graph database and the communication interface, the application interface configured to:
      receive a data service request via the communication interface;
      query the graph database to obtain a query result comprising a subset of graph structural components of the graph database; and
      filter the subset of graph structural components based on the data service request, the composite filtering parameter, and the tags extracted from the subset of graph structural components.

2. The system of claim 1, where the composite filtering parameter comprises a weight value determined responsive to a pre-defined graph probability model.

3. The system of claim 1, where the system circuitry is further configured to:
   receive supplemental data elements characterizing the industrial operation;
   extract an additional entity associated with the industrial operation from the supplemental data elements; and
   tag the additional entity with a selected industry-specific category determined from among the predefined industry-specific categories.

4. The system of claim 3, where the system circuitry is further configured to determine a weight value for the additional entity responsive to how the additional entity relates to existing graph structural components in the graph database.

5. The system of claim 4, where the system circuitry is further configured to determine to include the additional entity in the graph database when the weight value of the additional entity exceeds a pre-defined inclusion threshold.

6. The system of claim 1, where the system circuitry is further configured to store the composite filtering parameter as a property of the selected graph database structural component.

7. The system of claim 1, where in the system circuitry is further configured to store industry-specific category tags in the graph database as node properties.

8. The system of claim 1, where the selected graph database structural component comprises a node within the graph database.

9. The system of claim 1, where the selected graph database structural component comprises an edge within the graph database.

10. The system of claim 1, further comprising an intermediate data repository for storing an intermediate representation of the graph database, where the system circuitry is further configured to:
    access the graph database;
    derive the intermediate representation of the graph database; and
    store the intermediate representation in the intermediate data repository.

11. A method comprising:
    accessing predefined industry-specific categories with which to tag industry-specific entities associated with an industrial operation in an industrial setting for an industrial manufacturing facility, the industrial manufacturing facility being among a plurality of industrial manufacturing facilities in one or more domains;
    acquiring baseline industrial data elements associated with manufacturing processes common to the plurality of industrial manufacturing facilities from a first external data source;
    acquiring domain-specific data elements characterizing the industrial setting of the industrial operation for the industrial manufacturing facility associated with an industrial domain among the one or more domains of the plurality of industrial manufacturing facilities from a second external data source;
    acquiring implementation-specific data elements collected by the industrial manufacturing facility;
    extracting, from the baseline industrial data elements, the domain-specific data elements, and the implementation-specific data elements, data entities with tags for tagging each data entity with a specific category among the predefined industry-specific categories, wherein the tags are generated at data element level and a same tag applies to all entities extracted from a data element, wherein the tags are generated by processing each data element using a pretrained machine learning category classifier, and wherein the industry-specific categories being applicable to the plurality of industrial manufacturing facilities;
    extracting inter-category relationships between the data entities across the predefined industry-specific categories; and
    extracting intra-category relationships between the data entities within a selected category among the predefined industry-specific categories;
    storing the data entities with the tags, the inter-category relationships, and the intra-category relationships as graph structural components in a graph database in forms of nodes and edges, wherein the edges are associated with data structures for tagging each of the edges as either an inter-category edge or an intra-category edge; and
    determining a composite filtering parameter for a selected graph structural component in the graph database based on a relationship network of the selected graph structural component with other graph structural components in the graph database and based on composite filtering parameters of the other graph structure components;
    receiving a data service request;
    querying the graph database to obtain a query result comprising a subset of graph structural components of the graph database; and
    filtering the subset of graph structural components based on the data service request, the composite filtering parameter, and the tags extracted from the subset of graph structural components.

12. The method of claim 11, where the composite filtering parameter comprises a weight value determined responsive to a pre-defined graph probability model.

13. The method of claim 11, further comprising:
    receiving supplemental data elements characterizing the industrial operation;
    extracting an additional entity associated with the industrial operation from the supplemental data elements; and
    tagging the additional entity with a selected industry-specific category determined from among the predefined industry-specific categories.

14. The method of claim 13, further comprising determining a weight value for the additional entity responsive to how the additional entity relates to existing graph structural components in the graph database.

15. The method of claim 14, further comprising determining to include the additional entity in the graph database when the weight value of the additional entity exceeds a pre-defined inclusion threshold.

16. The method of claim 11, further comprising storing the composite filtering parameter as a property of the selected graph database structural component.

17. The method of claim 11, further comprising storing industry-specific category tags in the graph database as node properties.

18. The method of claim 11, where the selected graph database structural component comprises a node within the graph database.

19. The method of claim 11, where the selected graph database structural component comprises an edge within the graph database.

20. The method of claim 11, further comprising
    deriving an intermediate representation of the graph database; and
    storing the intermediate representation in an intermediate data repository.

* * * * *